Patented Feb. 9, 1932

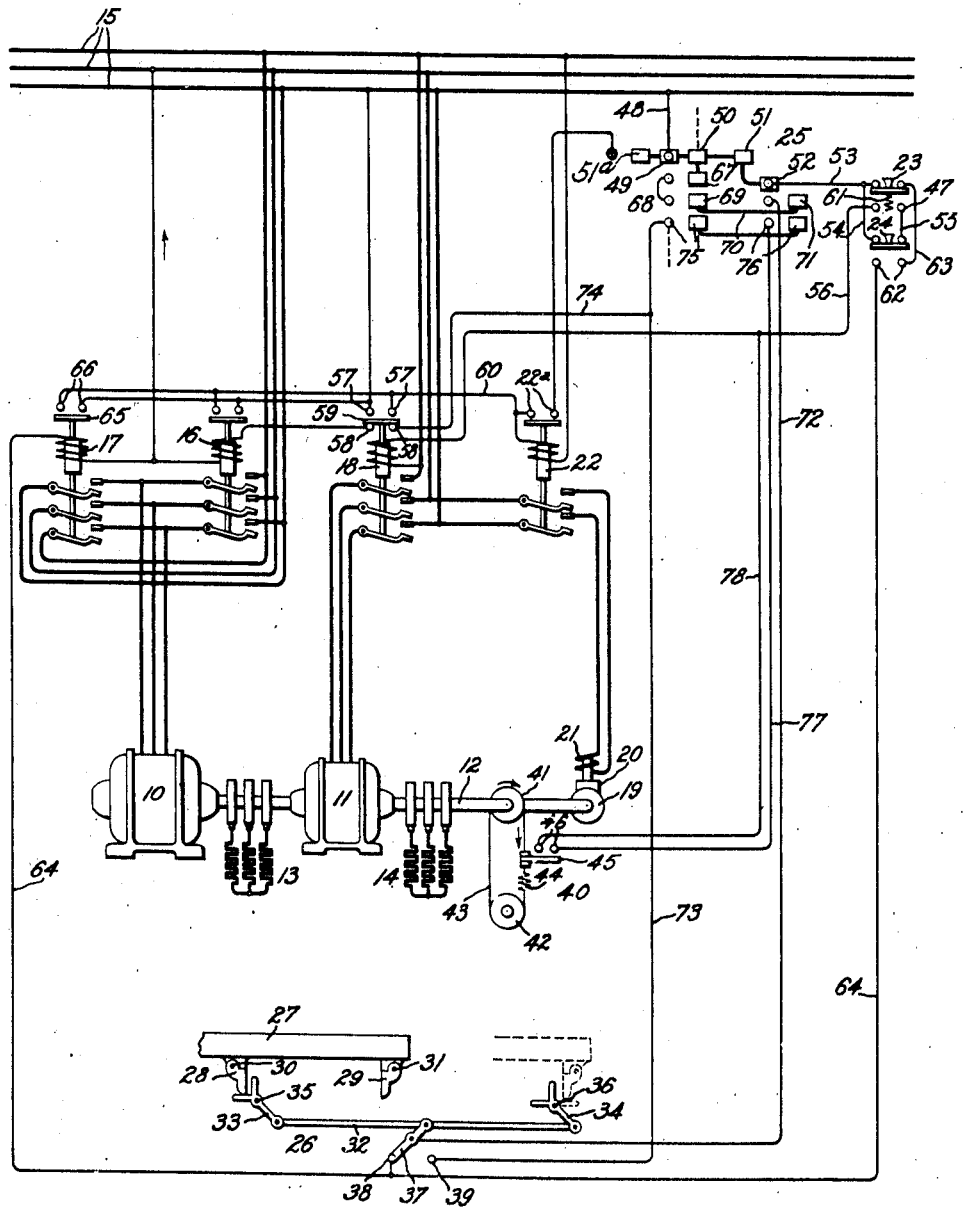

1,844,640

UNITED STATES PATENT OFFICE

CLARENCE W. CUTLER, OF WHEATON, AND STANTON B. SYKES, OF OAK PARK, ILLINOIS, ASSIGNORS TO GENERAL ELECTRIC COMPANY, A CORPORATION OF NEW YORK

MOTOR CONTROL SYSTEM

Application filed September 6, 1929. Serial No. 390,821.

This invention relates to systems for controlling the operation of electric motors; more particularly to systems for controlling the operation of electric motors employed in driving machine tools, the normal operations of which include periodic or recurring reversals, and has for an object the provision of an efficient, reliable and inexpensive system of the kind.

In the past it has been the practice in the operation of certain machine tools such for example as tapping machines to employ a two speed motor to advance the tap into the work at the highest permissible speed and also to withdraw the tap from the work at the maximum possible speed. Recent improvements and developments in machine tools have made possible the operation of machine tools at increased speeds and as a result, driving motors of more than proportionally increased ratings have become necessary to permit of the reversal of the machine at high speeds by plugging the motor without overheating. It will, of course, be appreciated that the inertia of rotating masses is greatly increased for increased speeds of rotation and that in order to reverse the direction of rotation quickly, the connections between the motor and the line must be reversed in order to dissipate the energy stored in the rotating masses. Accordingly an object of this invention is the provision of a system for driving a machine tool having a reversing cycle, at increased speeds, that will be more efficient and less expensive than the two speed motor of a rating sufficient to handle the duty cycle without being injured or destroyed.

In illustrating our invention in one form thereof we have shown it as embodied in a motor control system which though particularly adapted for driving a tapping machine is also applicable for driving any load or machine, the normal duty cycle of which includes frequent or periodic reversals such for example as washing machines, planers and the like.

In carrying our invention into effect in one form thereof, we provide two motors connected to drive a common load in opposite directions, together with means responsive to limited operation in either direction, for reversing the operation and for causing only one of the motors to plug the set to rest at both reversal points.

For a better and more complete understanding of the invention reference should now be made to the following specification and to the accompanying drawing the single figure of which is a simple diagrammatical representation of an embodiment of the invention.

Referring now to the drawing, the rotors of a plurality of motors 10 and 11 are mounted upon a common shaft 12 which may be the drive shaft for any load body or any machine tool such for example as a tapping machine. Since the mechanical driving connections between the drive shaft and the moving head which carries the tool into engagement with the work is well understood to persons skilled in this art, they have been omitted from this drawing for the purpose of simplification. The motors 10 and 11 may be of any suitable type but are preferably of the wound rotor type and as shown the rotors or secondaries of these motors are provided with slip rings to which are connected secondary resistances 13 and 14 respectively. As shown, the motor 11 is of smaller rating than the motor 10 and in the particular embodiment of the invention to be described in this specification the motor 11 serves to advance the tap into engagement with the piece of metal which is being drilled whilst the motor 10 serves to withdraw the tap after the threads have been cut. In addition to withdrawing the tap from the work the motor 10 also serves to plug the set to rest at both reversal points in the cycle, i. e., at the end of the tapping stroke and at the end of the tool withdrawing stroke. Since the tool may be withdrawn from the work at a speed greater than that at which threads may be cut, the motor 10 operates at a higher speed than the motor 11 and because of the additional duty imposed upon it, i. e., that of plugging the set to rest at each end of the stroke and of dissipating all the energy stored in the rotating and moving parts of the entire machine, the motor 10 is preferably of a larger rating than the motor 11. It is not to be understood however that the motor 10 will in all cases in which this invention might be utilized be larger than the motor 11, since conceivably there will be cases in which the motor 10 might be of equal or even smaller rating than the motor 11.

Electric power is supplied to the motor 10 from any suitable source of power such for example as that represented by the three supply lines 15 and suitable reversing contactors 16 and 17 are provided for connecting the primary terminals of the motor 10 with the source of supply 15 for operation both in the forward and in the reverse directions respectively. A single contactor 18 serves to connect the motor 11 with the source of supply 15 for operation in the forward direction only.

In order that the set may be brought quickly and evenly to rest when it is desired to shut down or at the end of a "jogging" or "inching" operation, a mechanical brake is provided. As shown, this brake comprises a brake drum 19 mounted upon the drive shaft 12 and a brake shoe 20 which is normally held in frictional engagement with the brake drum 19 by means of a spring (not shown) and which will be released in response to energization of the solenoid coil 21 when the solenoid contactor 22 is operated to the closed position.

In order that the set may be jogged or inched, i. e., operated a short distance in either direction, "forward" jogging switch 23 and "reverse" jogging switch 24 are provided for the purpose of connecting the motors 10 and 11 with the supply line 15 for forward and reverse operation respectively. Although the switches 23 and 24 may be of any suitable type they are shown as manually operated switches of the push button type and either switch 23 or 24 serves when depressed and while held depressed to close or maintain closed the contactor 18 or 17 as the case may be with which it is associated. The control of the operation of the set may be transferred from the manually controlled jogging to full automatic by means of a transfer switch 25 which may be of any suitable type but which as shown in the drawing is a simple two position drum switch which may be operated from its neutral to its operative position by means of a controller handle (not shown).

In order that the motors may be properly plugged and reversed at each end of the stroke of the tool, a limit switch 26 of any suitable type is provided for switching the control back and forth between the motors 10 and 11 at the proper instant. As shown, the limit switch 26 consists of a supporting head 27 which may be driven in accordance with the motion of the tapping machine either by being mounted upon the tool carrying head or through suitable connections with the drive shaft 12 as will be well understood by persons skilled in this art. The supporting head 27 of the limit switch is provided with a plurality of pivotally mounted ear-shaped cams 28 and 29. The cam 28 is pivotally mounted to rotate from the normal position in which it is shown in a clockwise direction about the pivot 30; whilst the cam 29 is mounted to rotate from the normal position in which it is shown in a counterclockwise direction about a pivot 31. A bar 32 is provided at either extremity with Y shaped cranks 33 and 34 respectively pivoted to rotate through an angle of approximately 90 degrees about the pivots 35 and 36. The bar 32 is provided intermediately of its ends with a movable contact member 37 which is adapted to engage either of the stationary contacts 38 or 39 when the bar 32 is actuated into either of its limiting positions by the cams 28 and 29 as will be more fully explained hereinafter in this specification.

In order that the motor 10 may be disconnected from the source of supply 15 after it has plugged the set to rest at the end of the tool withdrawing stroke and the motor 11 connected with the line for driving the tap into engagement with the work, a friction switch 40 is provided upon the drive shaft 12. As shown, the friction switch comprises two pulleys 41 and 42 over which a string or cord 43 is tightly stretched by a spring 44. A movable spring contact member 45 is carried by the cord 43 and may be actuated either into or out of engagement with the stationary contact members 46 depending upon the direction of rotation of the drive shaft 12. Although the friction switch shown is of the type familiarly referred to in the art as a "string relay" it will of course be appreciated that any suitable type of friction switch may be employed in its stead. For example a friction switch of the type described and claimed in United States Patent No. 1,677,008, Townsend, might be used.

With the above understanding of the elements and devices comprising an embodiment of this invention, the operation of the system which will now be described in detail will readily be understood. It will be assumed that the set is at rest and the switches are all in their normal or inoperative positions. Should it be desired to jog or inch the set in the forward direction the manually operated push button 23 may be actuated to its lower position in which it bridges the stationary contact members 47 to energize the actuating coil of contactor 18 of motor 11 over a circuit that may be traced from the lowermost supply line 15, through conductor 48, contact members 49, 50, 51 and 52 on drum switch 25, conductors 53, 54, push button 24 in its upper position conductor 55, push button 23 in its lower position, conductor 56, coil of contactor 18 to the upper supply line 15. Contactor 18 will then be actuated to the closed position in response to the energization of the coil and thus the primary terminals of motor 11 will be connected with supply 15 for operation in the forward direction, i. e., for advancing the tap drill into the work. It will also be observed that the contactor 18 is provided with upper and lower auxiliary stationary contacts 58 and 57 respectively. In the closed position of the contactor 18 the movable auxiliary contact 59 bridges the upper stationary contacts 57 to energize the coil of brake contactor 22 over a circuit that extends from the lower supply line 15 through the stationary and movable contacts 57, 59 over conductor 60, to and through the coil of brake contactor 22 to the upper side of supply line 15. The contactor 22 will then be actuated to its closed position to release the brake, i. e., the coil 21 will be energized across two sides of the supply line 15 and as a result the brake-shoe 20 will be released from the brake drum 19 and the motor 11 will advance the tool into the work as long as the push button 23 is held in engagement with the contact members 57. However, as soon as the finger is released the push button 23 will be returned to its normal position by the spring 61 and the circuits just traced will be deenergized which will permit the contactors 18 and 22 for the motor 11 and the brake respectively to return to the open position in which the motor 11 will be disconnected from the source of supply 15 and the brake shoe 20 will again be actuated into frictional engagement with the brake drum 19 to bring the set to rest.

In the event that it is desired to withdraw the tap from the hole a short distance, push button 24 may be depressed to its lowermost position in which it will bridge the stationary contact member 62 to establish an energizing circuit for the actuating coil of the contactor 17 for motor 10. This circuit extends from the lower supply line 15 to the point 53 as before and thence through push button 23, conductor 63, push button 24 and stationary contacts 62, conductor 64, through the coil of contactor 17 to the middle supply line 15. Contactor 17 moves to the upper position in response to the energization of its coil, thereby establishing connections for the reverse direction of rotation between the primary terminals of motor 10 and the power supply line 15.

It will also be observed that contactor 17 is provided with an auxiliary switch comprising movable contact members 65 and stationary contact members 66. In the upper position of the contactor 17 the stationary contact members 66 are bridged by the contact member 65 to establish an energizing circuit for the actuating coil of the brake contactor 22; the circuit extending from the lower supply line 15 through the contacts 65 and 66 to and through the coil of contactor 22 to the upper supply line 15, and as before the contactor 22 will be operated to the closed position and the brake will be released. When the finger is released the push button 24 will return to its normal position and the control circuits just traced will be deenergized and the contactors controlled thereby will be permitted to return to their normal or open positions.

If it is desired that the operating cycle shall proceed automatically, the drum switch 25 will be actuated to the left to its first operative position. It will be assumed that as shown the limit switch 26 is at one limit of its travel and that the tool, that is the tap drill, has been advanced to the limit of its stroke and is now in position to be run out, i. e., withdrawn from the hole. The actuation of the transfer switch 25 to its operative position establishes an energizing circuit for the actuating coil of contactor 17 that may be traced from the lower supply line 15 over the conductor 48 to contacts 49, 50 and 67, bridging connection 68, contact 69, bridging connections 70, contact 71, conductor 72, movable contact member 37 of the limit switch 26, conductor 64, coil of contactor 17 to the middle supply line 15. As a result of the energization of its coil contactor 17 will be actuated to the closed position in which it will establish power connections for the motor 10 in a direction to withdraw the tap from the hole.

In the upper position of the contactor 17, the auxiliary stationary contact members 66 are bridged by contact member 65 to release the brake 20 as explained before. When the brake contactor 22 is actuated to the closed position it establishes a maintaining circuit extending from the top supply line 15 through the coil of contactor 22 through auxiliary contacts 22a to contact 51a and thence to the lower supply line 15. Thereafter the brake may only be released by operating the transfer switch 25 to its neutral or inoperative position.

When the drive shaft is rotated in the direction just described the movable contact member 45 of the friction switch 40 will be maintained in its lower or open position as will be understood. As the tap is withdrawn from the hole the supporting head 27 of the limit switch will be driven from the left hand position in which it is shown toward the right. As the head travels to the right the ear-shaped cam 28 which is free to rotate about pivot 30 passes inoperatively over the upright lug of the Y shaped crank 33. The cams 28 and 29 are so spaced upon the head 27 that as the tap approaches the end of the running out stroke, the cam 29 engages the upright lug of the Y shaped crank 34 and actuates it through an angle of 90 degrees about its pivot 36 to cause the movable contact member 37 to be actuated into engagement with the stationary contact member 39 thereby deenergizing and opening contactor 17 and establishing an energizing circuit for the forward contactor 16 for motor 10; this circuit being traced from the lower supply line 15 to the movable contact member 37 as before, and thence by way of stationary contact 39 over conductors 73 and 74, through the lower auxiliary contacts 58 of contactor 18 to and through the actuating coil of contactor 16 to the middle supply line 15.

As a result of the energization of its coil, contactor 16 will immediately be actuated to the closed position and will tend to reverse the direction of rotation of the shaft 12. This disconnection of a driving motor from its supply line and immediate reconnection with the supply line for a reverse direction of rotation is referred to in the art as "plugging" the motor, and is an extremely effective method of bringing a motor quickly and evenly to rest. As soon as the stored energy in the rotating parts has been dissipated by the motor 10, the set will come to rest and immediately start to accelerate in the reverse direction and will thereby actuate the moving contact member 45 of the friction switch into engagement with the stationary contacts 46 to establish an energizing circuit for the coil of contactor 18 of motor 11. This circuit may be traced from the lower supply line 15 to the conductor 73 as before and thence through contacts 75 on the drum switch, contacts 76, conductor 78, to and through coil of contactor 18 to the upper supply line 15. As a result of the energization of its coil the contactor 18 will be actuated to the closed position to establish power connections for the motor 11 in a direction to continue driving the tap into the work.

Contactor 18 in responding to the energization of its coil also opens the lower auxiliary contacts 58 to deenergize the coil of contactor 16, thus disconnecting the motor 10 from its source of supply. During the advancing stroke of the tap, the supporting head 27 of the limit switch will be actuated to the left. As it passes from the right hand position indicated by the dotted lines toward the left, the ear-shaped cam 29 will pass inoperatively over the lug of the Y shaped crank 34 and when the tap reaches the end of its stroke the cam 28 will have arrived at the crank 33, and will operate the crank to cause the movable contact member 37 again to be operated into engagement with the stationary contact member 38, thereby deenergizing the contactor 18 for motor 11 and reclosing the energizing circuit for the contactor 17 over a circuit which has already been traced.

As before, the establishment of reverse power connections causes the motor 10 to be plugged and to dissipate the stored energy of the rotating parts of the set. When this energy has all been dissipated, the shaft 12 will come to rest and the motor 10 will rotate the shaft 12 in the reverse direction and run the tap out of the hole. From this point on, the cycle just described will be repeated as long as the transfer switch 25 is in an operative position.

Although no particular speeds are essential in the operation of our system, it has been found desirable in the operation of a tapping machine that the motor 11 should be a 900 R. P. M. motor and be normally operated at 600 R. P. M. by means of the speed reducing resistor 14. The motor 10 which besides plugging the set to rest at each end of the stroke of the tool also serves to withdraw the tool from the hole, may be operated at a considerably higher speed and in the system just described will preferably be operated at a speed of 1200 R. P. M.

Important advantages of the system just described are that the inertia of the set is less than would be the case for a single two speed motor of equivalent rating and the further fact that the voltage is removed from each motor during a portion of the cycle which prevents the motors being heated to the degree that would be the case if a single motor of equivalent rating were employed.

Although in accordance with the provisions of the patent statutes, we have described our invention as embodying particular apparatus and elements, it is to be understood that the invention is not limited thereto since modifications and alterations will readily suggest themselves to persons skilled in the art without departing from the true spirit of this invention or from the scope of the annexed claims.

What we claim as new and desire to secure by Letters Patent of the United States, is:

1. In a motor control system a pair of electric motors connected to drive a common load, a source of power for said motors, means operable in response to limited operation of one of said motors in one direction for disconnecting said motor from said source and establishing reverse power connection to plug said motor to rest, and means responsive to said plugging operation for interrupting said connections and connecting the other of said motors with said source for operation in the reverse direction.

2. In a motor control system, a pair of motors for driving a common load body in opposite directions, means operable in response to limited operation of one of said motors for stopping and reversing said motor, and means operable in response to the reversal of said motor for stopping said motor and starting the other of said motors.

3. In a motor control system the combination of a pair of motors for driving a common load body in opposite directions and a source of power for said motors, of means for connecting one of said motors with said source for operation in the forward direction, means operable in response to limited forward operation of said motor for reversing the power connections of said motor to stop said motor, and means operable in response to the reversal of said motor for interrupting said power connections and starting the other of said motors.

4. A motor control system comprising in combination a pair of motors for driving a common load in opposite directions, a source of power for said motors, means operable in response to limited operation of one of said motors for establishing reverse power connections to plug said motor to rest, means operable in response to the reversal of said motor for connecting the other of said motors with said source to drive said load in the reverse direction and for opening said plugging connections, and means operable in response to limited operation of said other motor for disconnecting it from said source and for reconnecting said first mentioned motor with said source to bring said load to rest and to accelerate said load in the opposite direction.

5. In a motor control system, a motor for operating a load body in the forward direction, a second motor for operating said load body in the reverse direction, means operable in response to limited operation of said forward motor for deenergizing said motor and for energizing said reverse motor to plug said load to rest and to accelerate it in the reverse direction, and operable in response to limited operation of said reverse motor for establishing reverse power connections to plug said load to rest, and means operable in response to the reversal of said load for deenergizing said reverse motor and energizing said forward motor.

6. An automatic reversing motor control system comprising a pair of electric motors, a driving connection between said motors, means responsive to limited operation of one of said motors in a forward direction to plug said motor to rest and to start the other of said motors in the reverse direction, means responsive to said reversal operation for deenergizing said first mentioned motor and means responsive to limited operation of said other motor to energize said first mentioned motor for operation in the forward direction to plug said other motor to rest.

7. An automatic reversing control system comprising a pair of electric motors for driving a common load in opposite directions, a mechanical connection between said motors, means responsive to limited operation of one of said motors in one direction to establish plugging connections to plug said motor and load to rest, means responsive to said plugging operation for establishing power connections for the other of said motors to drive said load in the reverse direction, means responsive to the establishment of said power connections for interrupting said plugging connections, and a limit switch responsive to limited operation of said other motor in the reverse direction for interrupting said power connections and establishing power connections for operation of said first mentioned motor to plug said other motor and load to rest.

8. An automatically reversing motor control system comprising a pair of motors having their rotors mounted upon a common shaft for driving a common load body in opposite direction, a limit switch operable in response to limited operation of one of said motors in the forward direction for deenergizing said motor and for energizing the second of said motors in the reverse direction to plug said first mentioned motor and said load to rest and to drive said load in the reverse direction, and operable in response to limited reverse operation to plug said second motor, and a friction switch actuated by said shaft and immediately responsive to the reversal of rotation thereof to reenergize said first mentioned motor.

9. In an automatically reversing motor control system a first motor for driving a load in a forward direction, a second motor for driving said load in the reverse direction, a source of power for said motor, a forward contactor for said first motor, forward and reverse contactors for said second motor, a limit switch operable in response to limited operation of said first motor for operating said first mentioned contactor to disconnect said first motor from said source and for closing said reverse contactor for connecting said second motor with said source to plug said first motor and load to rest and to drive said load in the reverse direction and operable in response to limited operation of said second motor in the reverse direction for opening said reverse contactor and closing said forward contactor for said motor to plug said second motor, and a friction switch operable in response to reversal of said second motor to reclose the forward contactor for said first motor.

10. In an automatically reversing motor control system, a set comprising a pair of motors having their rotors mounted on a common shaft for driving a common load in opposite directions, a source of electric power for said motors, a forward contactor for connecting one of said motors with said source to drive said load in a forward direction, forward and reverse contactors for the second of said motors, a limit switch operable in response to limited operation of said first mentioned motor to open said forward contactor for said first mentioned motor and to close the reverse contactor for said second motor to plug said set and to drive said load in the reverse direction, and operable in response to limited operation of said second motor in the reverse direction to open the reverse contactor and close the forward contactor for said second motor to plug said set, and a friction switch operable in response to the reversal of said second motor to close the forward contactor for said first mentioned motor and to open the forward contactor for said second motor.

11. In a motor control system, a plurality of motors for driving a common load body, means operable in response to limited operation of one of said motors in one direction for establishing reverse power connections to plug said motor to rest, and means operated by said motor for rendering said motor inactive and another of said motors operative to drive said load in the reverse direction.

In witness whereof we have hereunto set our hands this 30th day of August, 1929.

CLARENCE W. CUTLER.
STANTON B. SYKES.